(12) United States Patent
Weruaga et al.

(10) Patent No.: US 12,306,319 B2
(45) Date of Patent: May 20, 2025

(54) METHOD AND APPARATUS FOR MEASURING DIRECTIONS OF ARRIVAL OF MULTIPLE SOUND SOURCES

(71) Applicant: PROACTIVAUDIO GmbH, Vienna (AT)

(72) Inventors: Luis Weruaga, Vienna (AT); Mathias Lehnfeld, Vienna (AT); Stefano Bider, Vienna (AT)

(73) Assignee: PROACTIVAUDIO GmbH, Vienna (AT)

( * ) Notice: Subject to any disclaimer, the term of this patent is extended or adjusted under 35 U.S.C. 154(b) by 281 days.

(21) Appl. No.: 18/021,333

(22) PCT Filed: Aug. 31, 2020

(86) PCT No.: PCT/EP2020/074197
§ 371 (c)(1),
(2) Date: Feb. 14, 2023

(87) PCT Pub. No.: WO2022/042864
PCT Pub. Date: Mar. 3, 2022

(65) Prior Publication Data
US 2024/0012083 A1    Jan. 11, 2024

(51) Int. Cl.
*G01S 3/808* (2006.01)
*H04R 3/00* (2006.01)

(52) U.S. Cl.
CPC ............ *G01S 3/8083* (2013.01); *H04R 3/005* (2013.01); *H04R 2201/401* (2013.01); *H04R 2430/20* (2013.01)

(58) Field of Classification Search
CPC ....... G01S 3/8083; G01S 3/808; H04R 3/005; H04R 2201/401; H04R 2430/20; G10L 21/0208
See application file for complete search history.

(56) References Cited

U.S. PATENT DOCUMENTS

| | | | |
|---|---|---|---|
| 10,334,357 B2 * | 6/2019 | Atkins | ...................... G06N 3/08 |
| 2019/0090052 A1 * | 3/2019 | Radmanesh | ........... H04R 1/406 |
| 2019/0355373 A1 * | 11/2019 | Nesta | .................... G10L 21/028 |

FOREIGN PATENT DOCUMENTS

WO     2017/129239 A1    8/2017

OTHER PUBLICATIONS

PCT International Preliminary Report on Patentability corresponding to International Application No. PCT/EP2020/074197 dated Feb. 28, 2023.

(Continued)

*Primary Examiner* — Yosef K Laekemariam
(74) *Attorney, Agent, or Firm* — Hoffman & Baron, LLP

(57) ABSTRACT

A computer-implemented method for measuring the directions of arrival, DOAs, of acoustic signals recorded by a microphone array outputting audio signals, comprising: bandpass-filtering the audio signals into at least one spectral band; in each spectral band, for at least one pair of microphones, computing a cross-product between the audio signals of said pair, iteratively minimizing an error between the cross-products and model cross-products calculated from DOA estimates, and determining those DOA estimates whose powers constitute local maxima, as DOA candidates; and measuring the DOAs of the acoustic signals from the DOA candidates of all spectral bands. Further disclosed is an apparatus for performing this method.

14 Claims, 8 Drawing Sheets

(56) References Cited

OTHER PUBLICATIONS

PCT International Search Report corresponding to International Application No. PCT/EP2020/074197, dated Apr. 28, 2021.

* cited by examiner

| source | iter $\kappa$ | $\theta$ | $\phi$ | $\rho$ | $D$ (%) |
|---|---|---|---|---|---|
| #1 | actual | 160° | 15° | 0.5 | |
| | ini | 161° | 0° | 0.51 | 39 % |
| | final | 160° | 21° | 0.48 | 6 % |
| #2 | actual | 130° | 30° | 0.5 | |
| | ini | 127° | 0° | 0.47 | 39 % |
| | final | 129° | 27° | 0.48 | 6 % |

*Fig. 8*

METHOD AND APPARATUS FOR MEASURING DIRECTIONS OF ARRIVAL OF MULTIPLE SOUND SOURCES

CROSS-REFERENCE TO RELATED APPLICATION

This application is a National Phase application of International Application No. PCT/EP2020/074197 filed Aug. 31, 2020, the disclosure of which is incorporated herein by reference.

TECHNICAL FIELD

The present disclosed subject matter relates to a computer-implemented method for measuring the directions of arrival of a plurality of acoustic sources from signals captured by a microphone array composed of at least two microphones. The disclosed subject matter further relates to an apparatus configured to execute said method.

BACKGROUND

Speech-capturing devices, such as those in telephones, tablets, computers, videoconference systems, home assistants, et cetera, are growing in complexity because of the need for enhancing the main speech signal against competitive interfering sounds present in the acoustic scene, such as background noise, music, and other speech signals. Furthermore, the need to capture distant sounds, arriving from the "far field", represents a mandatory feature in most speech interfaces within home assistants, smart TVs, and future audio systems.

A set of microphones arranged according to a specific geometry is becoming the most popular technological solution to said problems. The electronic "beamforming" ability of a microphone array built with micro-electromechanical systems (MEMS), that is, to focus on the desired direction that the main acoustic signal is travelling from, presents many advantages against static directional microphones: the small size factor of MEMS microphones allows for easy integration to any form factor; the replicability of MEMS manufacturing process, paramount in the spatial-filtering performance, is not found in other microphone technologies; and, since the microphone signals are combined digitally, several sound sources can be simultaneously captured in separate audio channels.

The present disclosure is not restricted to the use of MEMS microphones, but to any other technology that acoustic beamforming is practical with. The previous arguments are simply brought to the table as explanatory and illustrative of today's state of the art on microphone array processing.

Most audio-enhancement recording techniques based on microphone arrays require to know in advance the direction of arrival (DOA) of the main incoming sound source. The very microphone array can also be used to infer said information based on the fact that the sound wave reaches the microphones at different times, leaving a time-of-arrival pattern deterministically related to the DOA.

Cross-correlation between the signals from microphone pairs is the conventional approach to estimate said time differences. While that classical technique yields acceptable DOA estimates for one single sound source, when two or more sources are simultaneously active more refined approaches are necessary. As an example thereof, the speech recording in meetings with several participants 10 that are handicapped by nearby acoustic interferences is illustrated in FIG. 1. The array 20 of microphones 25 carries then a two-fold mission, namely, to infer the location of the elements present in the acoustic scene (sound sources, and interferences), and to record-and-enhance the desired sounds by means of beamforming 30.

Therefore, the localization of simultaneous acoustic sources from the signals of a microphone array is not only a fundamental technique in audio enhancement but it also raises intense research activity in many other audio applications. The present disclosure deals with said problem and a method and apparatus 50 therefor.

The scenario of concern is namely an array of microphones placed at known locations $r_k$, where k denotes the microphone index, and at least one sound source, placed at unknown location s, both inside an acoustic room. Said location vectors n, and s contain three components related to the three-dimensional (3D) space. The relative time differences $\tau_k$ it takes for the sound wave to travel from the source to the individual microphone 25—i.e. with respect to the center of the microphone array 20, which for simplicity and without loss of generality is considered to be the origin of coordinates r=[0,0,0]$^T$— are given by the following equation $$\tau_k = c^{-1}(\|s - r_k\| - \|s\|) \qquad (1)$$

where $\|x\|$ stands for Euclidean norm of column vector x, and c is the speed of sound.

Very commonly the sound source is found in the "far field", that is, the distance $\|s\|$ is at least 10 times larger than the array dimensions, and the previous equation can be approximated as follows $$\tau_k(v) = c^{-1} r_k^T v \qquad (2)$$

where $^T$ denotes vector transpose, and n is the vector with the direction of arrival (DOA) of the source, related to its location as $$v = s/\|s\|.$$

Said DOA vector can be described as function of the azimuth $\theta$ and elevation $\phi$ angles as $$v = [\cos\phi \cos\theta, \cos\phi \sin\theta, \sin\phi]^T. \qquad (3)$$

A popular array architecture is illustrated in FIG. 2, with five exemplary microphones 25 lying on a plane such as the horizontal plane r=[x,y,0]$^T$. As the third coordinate of the microphone locations $r_k$ is zero, the corresponding coordinate in v becomes moot, and the number of degrees of freedom in a planar array turns equal to two. Such a dimensionality reduction has implications on the array capabilities, namely, the array cannot distinguish between two incoming sound waves that are mirrored to said plane; nonetheless, since the planar microphone array is supposed to be lying on a horizontal surface (floor, table, wall, ceiling), sources are usually found only on one side of the plane. In summary, while the azimuth has a 360-degree coverage, the elevation range simply goes from 0 to 90 degrees; the microphone locations can be defined with two coordinates, e. g. r=[x,y]$^T$, and the DOA vector v can be simplified as $$v = \cos\phi \begin{bmatrix} \cos\theta \\ \sin\theta \end{bmatrix}. \qquad (4)$$

In case the microphones 25 are placed along a line, only the azimuth, spanning from 0 to 180 degrees (as the array cannot determine in which halve of the azimuth the wave is coming from), is required, and the effective number of dimensions in the DOA vector is simply one; only one space coordinate is necessary, such as r=x, and the effective DOA vector becomes v=cos θ. The DOA vector in a full 3D array, such as four microphones placed at the corners of a tetrahedron, has all three components like (3): the azimuth θ and the elevation ϕ covers all 3D directions, such that the latter spans from −90 to 90 degrees.

When only one acoustic source is present in the scene, the signal captured at the kth microphone can be described with the following model $$x_k(t) = \alpha_k s(t - \tau_k(v)) + u_k(t) \quad (5)$$

where t is continuous time, s(t) refers to the signal produced by the sound source, $a_k$ corresponds to the attenuation experienced by the sound wave on its way to the kth microphone, and $u_k(t)$ is the interference signal. Given that the source is in the far field, its sound wave reaches all microphones with similar intensity level, hence said factor can be henceforth disregarded, e.g. $\alpha_k=1$.

The single-source model can be extended to multiple simultaneous sources $$x_k(t) = \sum_i s_i(t - \tau_k(v_i)) + u_k(t) \quad (6)$$

where $s_i(t)$ is the ith source signal at the array center and $v_i$ its DOA vector. The interference here $u_k(t)$ encompasses the diffuse noise and reverberation from all sources. It is important to remark that the first term in (6) corresponds to the direct acoustic path between each source location and the array, while secondary acoustic paths, resulting from acoustic reflections in the room walls and objects therein, of lower level than the direct one, are part of the interference term $u_k(t)$.

A popular method to detect the presence of acoustic sources from the microphone signals is by monitoring the so-called steered-response power (SRP), which is equivalent to the following formula $$P(v) = \int \left| \sum_k x_k(t + \tau_k(v)) \right|^2 dt. \quad (7)$$

The SRP function is likely to reach a local maximum for the actual DOA vector of the ith source $v_i$.

In the practice, the microphone signals are transformed to digital signals with a sampling process at rate fs in Hertz units. In the discrete-time domain, said SRP function can be expressed as a sum of Generalized Cross-Correlations (GCCs) for the different microphone pairs at the searching spatial location $$P(v) = \sum_k \sum_\ell \int \Phi_{k\ell}(\omega) X_k(\omega) X_\ell^*(\omega) \exp(j\omega f_s(\tau_k(v) - \tau_\ell(v))) d\omega \quad (8)$$

where $j=\sqrt{-1}$, operator * denotes complex conjugate, w is the frequency counterpart to discrete time, $X_k(\omega)$ is the Fourier transform of the kth microphone signal, and $\Phi_{k\ell}(\omega)$ is a spectral weighting function.

The so-called phase transform (PHAT) forces the GCC to consider only the phase information of the involved signals by using the following weighting $$\Phi_{k\ell}(\omega) = \frac{1}{|X_k(\omega) X_\ell^*(\omega)|}. \quad (9)$$

The popular SRP-PHAT algorithm consists in a grid-search procedure that evaluates the objective function P(n) on a plurality of candidate locations, and the DOA estimates result from the grid items that point out to local maxima.

The SRP resolution strongly depends on the array geometry, that is, the number of microphones and spacing between microphone pairs. If only one source is active, the local maximum in the SRP function is indeed found at the DOA of the source. However, if two or more sources are simultaneously active, one source negatively impacts the estimation of the DOA of the second one, and vice versa: two sources located sufficiently close to each other are likely to be seen as one single SRP maximum; the location of said local maximum turns out a weighted average of the respective actual DOAs.

It is necessary to mention that in the practice not all frequencies need to be involved in the SRP computation (8), but only the spectral band that turns more relevant according to the array geometry; likewise, not all combinations of microphone pairs need to be used.

In "System and apparatus for tracking moving audio sources" WO 2017/129239 A1 the full-band spatial energy distribution is obtained from the SRP-PHAT transform, and said spatial energy distribution is translated into multiple DOA measurements by fitting a wrapped Gaussian mixture model thereto.

In "SVD-PHAT: A fast sound source localization method" pp. 4140-4144, ICASSP 2019 the DOA estimation of several sources is approached by single-value decomposing (SVD) the SRP-PHAT matrix built with selected microphone pairs and frequency bins; said SVD operation is meant to extract the essential DOA cues from that information wealth.

The method disclosed in "Sound source localization apparatus and separation" WO 2016/100460 A1 approaches the DOA estimation with an iterative analysis of three-level tensors built with selected frequency bins, time frames, and microphones.

"Method and circuitry for direction of arrival estimation using microphone array with a sharp null" U.S. Pat. No. 9,479,867 B2 employs a plurality of notch-beamformers configured for a plurality of searching directions; minima in the beamformer energy indicate the presence of sound sources.

The method disclosed in "Direction of arrival estimation for multiple audio content streams" U.S. Ser. No. 10/455, 325 B2 shatters the input signal(s) into the sound sources with a plurality of filters driven by a neural network, trained with sound content corresponding to a plurality of sound content categories; DOA estimation for each separate source is applied on the respective filter output.

For hearing aids of reduced dimensions the method in "Direction of arrival estimation in miniature devices using a sound sensor array" EP 3267697 A1 tackles the single-source DOA estimation with a Taylor expansion and a least-squares optimization; as higher Taylor orders relate to higher frequencies, hence a plurality of signal components are included in the global optimization, this approach resembles an exhaustive search over the cross-correlation between microphones.

In "360-degree multi-source location detection, tracking and enhancement" US 2019/0355373 A1 a spatial likelihood function is evaluated on a grid of values for θ and ϕ according to a desired resolution; sparsity is imposed in the likelihood by selecting only the most dominant positions as DOA estimate.

The method "Machine learning based sound field analysis" U.S. Ser. No. 10/334,357 B2 employs a deep neural network (DNN) for processing the raw spatial spectrum based on the SRP-PHAT for a plurality of sub-bands; the DNN is trained with said raw input data and the actual target directional feature.

All previous methods agree upon that, when several sources are present in the scenario, attempting to infer DOA information from the raw SRP function frequently leads to inaccurate estimates. The last method of the above review is symptomatic of the current conventional wisdom: the mapping between the SRP function and the actual DOA of the sources are considered to be of highly nonlinear nature, such that said mapping cannot be determined but with an opaque learning system such as a deep neural network.

In conclusion, the estimation of multiple simultaneous acoustic sources with a microphone array is still an open technological problem.

BRIEF SUMMARY

It is therefore an object of the disclosed subject matter to provide a method and an apparatus for measuring the DOAs of acoustic signals received at a microphone array with increased precision. It is a further object of the disclosed subject matter to provide such methods and apparatus which are able to distinguish between multiple simultaneous acoustic sources and measure their individual DOAs with increased precision. It is another object of the disclosed subject matter to provide such methods and apparatus with low computational needs so that they can be implemented on low-cost embedded microprocessors or small signal processing chips for real-time applications in speech interfaces, hands-free and/or noise-cancelling headsets, smart phones, car radios, conference audio systems, etc.

To solve the aforementioned problems, in a first aspect the disclosed subject matter provides for a computer-implemented method for measuring the directions of arrival, DOAs, of acoustic signals recorded by an array of at least two microphones outputting respective audio signals, comprising:

- bandpass-filtering the audio signals into at least one spectral band;
- in each spectral band, for at least one pair of microphones, computing a cross-product between the audio signals of said pair, yielding a set of cross-products per spectral band;
- in each spectral band, iteratively minimizing an error between the cross-product set and a model cross-product set calculated from a set of DOA estimates, wherein each DOA estimate comprises a DOA vector and a power, wherein the powers of the DOA estimates are changed with every iteration, and wherein in each iteration all those DOA estimates are removed from the DOA estimate set whose powers have a negative value;
- in each spectral band, determining from the DOA estimate set those DOA estimates whose powers constitute local maxima, as DOA candidates, yielding a set of DOA candidates per spectral band;
- merging the DOA candidate sets of all spectral bands into a merged DOA candidate set; and
- measuring the DOAs of the acoustic signals from the merged DOA candidate set.

The method of the disclosed subject matter is capable of distinguishing between simultaneously active acoustic sources distributed in space around a microphone array. The method is able to determine the DOAs of the acoustic signals of the individual sources and, hence, the spatial direction of the acoustic sources from the microphone array.

Removing in each iteration all those DOA estimates from the respective DOA estimate set whose estimated powers have a negative value dramatically improves the speed of convergence and reduces the computing needs for finding the minimum of the error. The iterative algorithm reaches convergence once the set of DOA estimates, the "matrix" of possible DOA solutions, has only non-negative values. Clearing-out "negative" DOA estimates from the DOA estimate set, e.g., deleting or setting to zero those DOA estimates in the rows and columns of the matrix that show a negative estimated power in an iteration, leads to a solving algorithm that can be executed very fast on any processor, yielding a quick rough initial assessment of the DOAs of multiple simultaneously active acoustic sources.

Clearing-out DOA estimates with a negative estimated power from the set of DOA estimates is—when the set is stored as a matrix—equivalent to a progressive "sparsification" of the matrix with each iteration. When the iteration algorithm converges, this leads to an extremely sparsified set of DOA estimates, from which the DOA candidates can be easily "picked" as those DOA estimates whose powers constitute local maxima with respect to directions, i.e., when plotted versus their DOA vectors. Such progressive sparsification also progressively accelerates the convergence of the minimum search and, as a result, the measurement of the DOAs.

By analysing the audio signals in a distinct spectral band, optionally in a multitude of different spectral bands concurrently, and by appropriately choosing that/those spectral band/s a good compromise is achieved between spatial resolution on the one hand and suppression of spatial aliasing artefacts on the other hand: High spectral bands can deliver a good spatial resolution, however, at the risk of identifying aliasing ("mirror", "fake") acoustic sources in space. Low spectral bands, while avoiding those artefacts, suffer from a poorer spatial resolution, and some acoustic sources may not have enough acoustic energy in lower bands. Thus, by choosing an appropriate spectral band for the analysis a good trade-off between accuracy, reliability and sensitivity of the method can be achieved. When multiple spectral bands are analysed simultaneously, the accuracy, reliability and sensitivity of the measuring method can be dramatically increased over all known methods.

To the latter end, in an embodiment of the disclosed subject matter the audio signals are bandpass-filtered into at least two spectral bands.

Optionally, cross-products are computed for at least two pairs of microphones. This further increases the accuracy and reliability of the DOA measurements and improves convergence of the iteration in finding the minimum of the error between the "input" (the cross-product set) and the "model" (the model cross-product set).

According to another embodiment of the disclosed subject matter, said error between the input and the model is defined by the term $$\sum_k \sum_l \left| \xi_{kl,\omega} - \sum_\theta \sum_\phi \rho_{\theta\phi} \exp(j\omega\gamma v_{\theta\phi}^T \delta_{kl}) \right|^2$$

and minimized with respect to $\rho_{\theta\phi}$ under the constraint $$\rho_{\theta\phi} \geq 0$$

with:
$\xi_{kl,\omega}$ . . . cross-product in spectral band $\omega$ between kth audio signal and lth audio signal, the cross-products of all pairs k, l building the cross-product set, $$\sum_\theta \sum_\phi \rho_{\theta\phi} \exp(j\omega\gamma v_{\theta\phi}^T \delta_{kl}) \ldots$$

model cross-product in spectral band $\omega$ between kth audio signal and lth audio signal based on the set of DOA estimates each comprised of the DOA vector $v_{\theta\phi}$ and the power $\rho_{\theta\phi}$, the model cross-products of all pairs k, l building the model cross-product set,
$\theta$ . . . azimuth angle,
$\phi$ . . . elevation angle,
$v_{\theta\phi}$ . . . DOA vector [cos $\phi$ cos $\theta$, cos $\phi$ sin $\theta$, sin $\phi$] of the respective DOA estimate,
$\rho_{\theta\phi}$ . . . estimated acoustic signal power at the microphone array in the direction of the DOA vector of the respective DOA estimate,
k . . . index of kth microphone,
l . . . index of lth microphone,
$\delta_{kl}$ . . . vector from lth microphone to kth microphone,
$\omega$ . . . center frequency of spectral band in question,
$\gamma$ . . . sampling rate of the digitized audio signals divided by the speed of sound,
exp . . . exponential function,
j . . . square root of $-1$, and
T . . . designating the transpose.

There are different variants of merging the DOA candidate sets of multiple spectral bands possible. In a first variant, the step of merging comprises forming a union set of the DOA candidate sets of all spectral bands. In a second variant, the step of merging comprises forming an intersection set of the DOA candidate sets of all spectral bands with respect to their DOA vectors. While the first variant improves reliability of the results, the second variant fares slightly better in processing speed.

While the method described so far excels in speed and low computational requirements, the accuracy of the DOA measurements may still not be sufficient for certain applications. Therefore, in a further aspect the disclosed subject matter provides for an embodiment of the disclosed method which yields particularly reliable and accurate results.

According to this embodiment of the disclosed subject matter, the step of measuring further comprises:
iteratively minimizing a global error between the cross-product sets of all spectral bands and a model global cross-product set calculated from the merged DOA candidate set, wherein the DOA vectors and powers of the merged DOA candidate set are changed with every iteration; and then
determining the DOAs of the acoustic signals from the merged DOA candidate set.

In this way, the method comprises a second stage of "fine-tuning" the DOA candidates of the merged DOA candidate set of the first stage by searching an optimum (error minimum) over all spectral bands. In the finetuned merged DOA candidate set possible "fake" DOA candidates, i.e. that actually pointed to spatial aliasing artefacts, have vanished, as their powers have converged to approximately zero. The DOA candidates that correspond to actual acoustic sources prevail, as they exhibit dominant spectral energy.

Optionally, said global error is defined by the term $$\sum_\omega \sum_k \sum_l \left| \xi_{kl,\omega} - \sum_m \rho_{m,\omega} \exp(j\omega\gamma v_m^T \delta_{kl}) \right|^2$$

and minimized with respect to both $v_m$ and $\rho_{m,\omega}$ under the constraint $$\rho_{m,\omega} \geq 0$$

with
$\xi_{kl,\omega}$ cross-product in spectral band $\omega$ between kth audio signal and lth audio signal, the cross-products of all pairs k, l and over all spectral bands $\omega$ building the cross-product set of all spectral bands, $$\sum_m \rho_{m,\omega} \exp(j\omega\gamma v_m^T \delta_{kl}) \ldots$$

model cross-product in spectral band $\omega$ between kth audio signal and lth audio signal based on all DOA candidates each comprised of the DOA vector $v_m$ and the power $\rho_{m,\omega}$ of the mth DOA candidate in spectral band $\omega$, the model cross-products of all pairs k, l and over all spectral bands $\omega$ building the model global cross-product set,
$v_m$ . . . DOA vector [cos $\phi_m$ cos $\theta_m$, cos $\phi_m$ sin $\theta_m$, sin $\phi_m$] of the mth DOA candidate,
$\rho_{m,\omega}$ . . . estimated acoustic signal power at the microphone array per spectral band $\omega$ in the direction of the DOA vector of the mth DOA candidate,
k . . . index of kth microphone,
l . . . index of lth microphone,
m . . . index of mth DOA candidate,
$\delta_{kl}$ . . . vector from lth microphone to kth microphone,
$\omega$ . . . center frequency of spectral band in question,
$\gamma$ . . . sampling rate of the digitized audio signals divided by the speed of sound,
exp . . . exponential function,
j . . . square root of $-1$, and
T . . . designating the transpose.

Again, as in the first stage for finding the minimum in the individual spectral bands, for finding the minimum of the global error in the second stage any iterative solving algorithm can be employed. However, as the number of the DOA candidates in the DOA candidate set is now far less than the number of DOA estimates was in the DOA estimate set, a more accurate, computationally more demanding algorithm can be used, e.g., a Newton-Raphson algorithm, to find the minimum of the global error.

The minimized, i.e. residual, error at the end of the iterative minimum search for the minimum of the global error can further be used as a quality measure of the determined DOAs. In fact, diffuse noise and reverberations which represent acoustic sources without specific DOAs yield a large residual global error at the end of the minimisation. Hence, according to another embodiment of the disclosed subject matter the step of determining further comprises validating the determined DOAs when the minimized global error, normalized with respect to the sum of the cross-product sets of all spectral bands, exceeds a predetermined threshold. By this means, validated DOAs can be accepted and unvalidated DOAs rejected for further processing, i.e., only DOAs of good quality are accepted as measurement results.

In a second aspect the disclosed subject matter achieves its aims by providing an apparatus for measuring the directions of arrival, DOAs, of acoustic signals, comprising:

an array of at least two microphones configured to record the acoustic signals and to output respective audio signals;

at least one filter-bank, each filter bank being connected to one of the microphones and configured to bandpass-filter the audio signal of that microphone into at least one spectral band;

at least one cross-product module connected to the filter-bank/s, each cross-product module being assigned to one spectral band and configured to compute, for each spectral band, a cross-product between the audio signals of a respective pair of microphones, yielding a set of cross-products per spectral band;

at least one iteration module connected to the cross-product modules, each iteration module being assigned to one spectral band and configured to iteratively minimize an error between the cross-product set and a model cross-product set calculated from a set of DOA estimates, wherein each DOA estimate comprises a DOA vector and a power, wherein the powers of the DOA estimates are changed with every iteration, and wherein in each iteration all those DOA estimates are removed from the DOA estimate set whose powers have a negative value; and a measuring module connected to the iteration module/s and configured to determine, in each spectral band, from the DOA estimate set those DOA estimates whose powers constitute local maxima, as DOA candidates, yielding a set of DOA candidates per spectral band, to merge the DOA candidate sets of all spectral bands into a merged DOA candidate set, and to measure the DOAs of the acoustic signals from the merged DOA candidate set.

Optionally, each filter-bank is configured to bandpass-filter the audio signals into at least two spectral bands. Further optionally, the apparatus comprises at least two cross-product modules.

According to another embodiment of the apparatus of the disclosed subject matter the measuring module comprises a global iteration module, the global iteration module being configured to iteratively minimize a global error between the cross-product sets of all spectral bands and a model global cross-product set calculated from the merged DOA candidate set, wherein the DOA vectors and powers of the merged DOA candidate set are changed with every iteration, and wherein the measuring module is configured to determine the DOAs of the acoustic signals from the merged DOA candidate set after the global iteration module has minimized the global error.

For further features and benefits of the apparatus the same applies as has been described for the disclosed method.

BRIEF DESCRIPTION OF THE DRAWINGS

The disclosed subject matter shall now be explained in more detail below on the basis of the exemplary embodiments thereof with reference to the accompanying drawings, in which:

FIG. 8 brings the numerical performance indicators of the proposed method in the scenario presented in FIG. 6.

DETAILED DESCRIPTION

Figure 1:
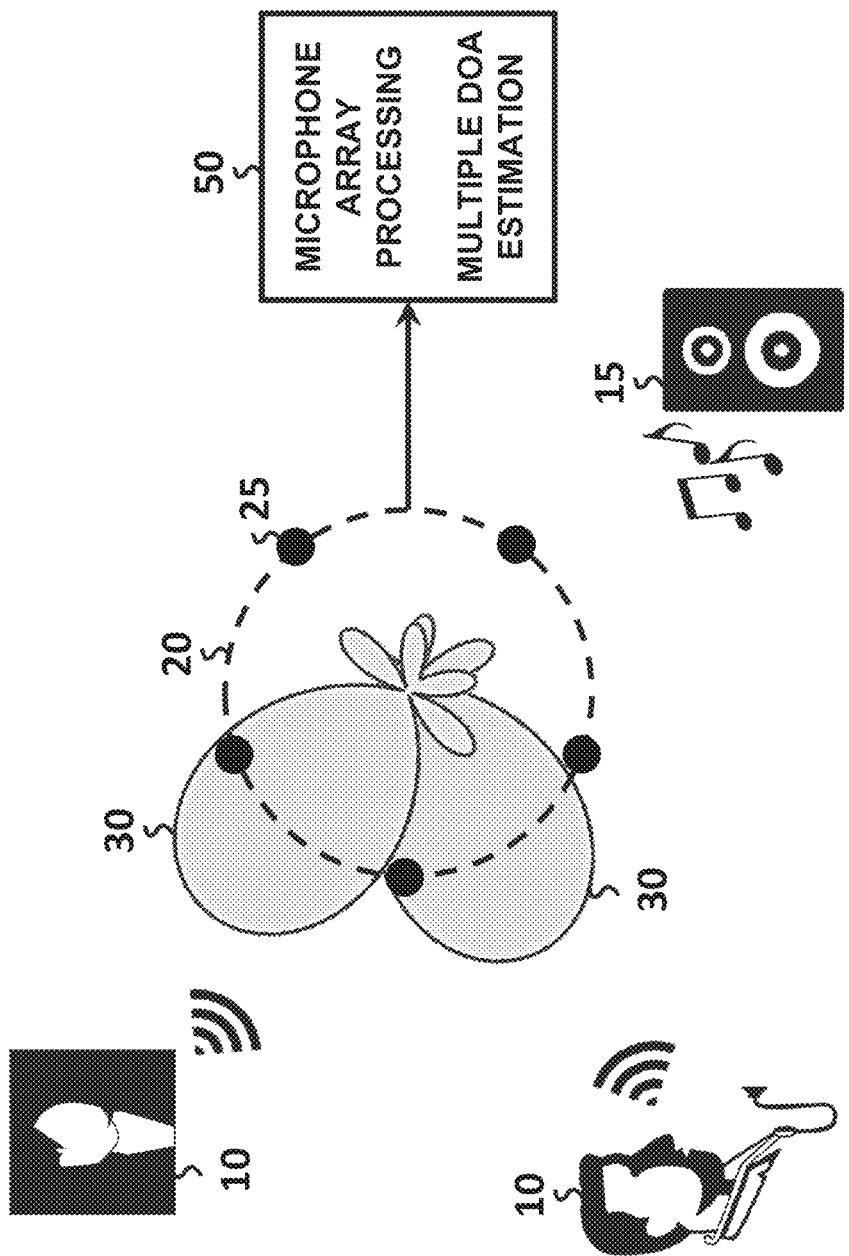
FIG. 1 illustrates the problem of audio recording with a microphone array when several sound sources are simultaneously active.
Figure 2:
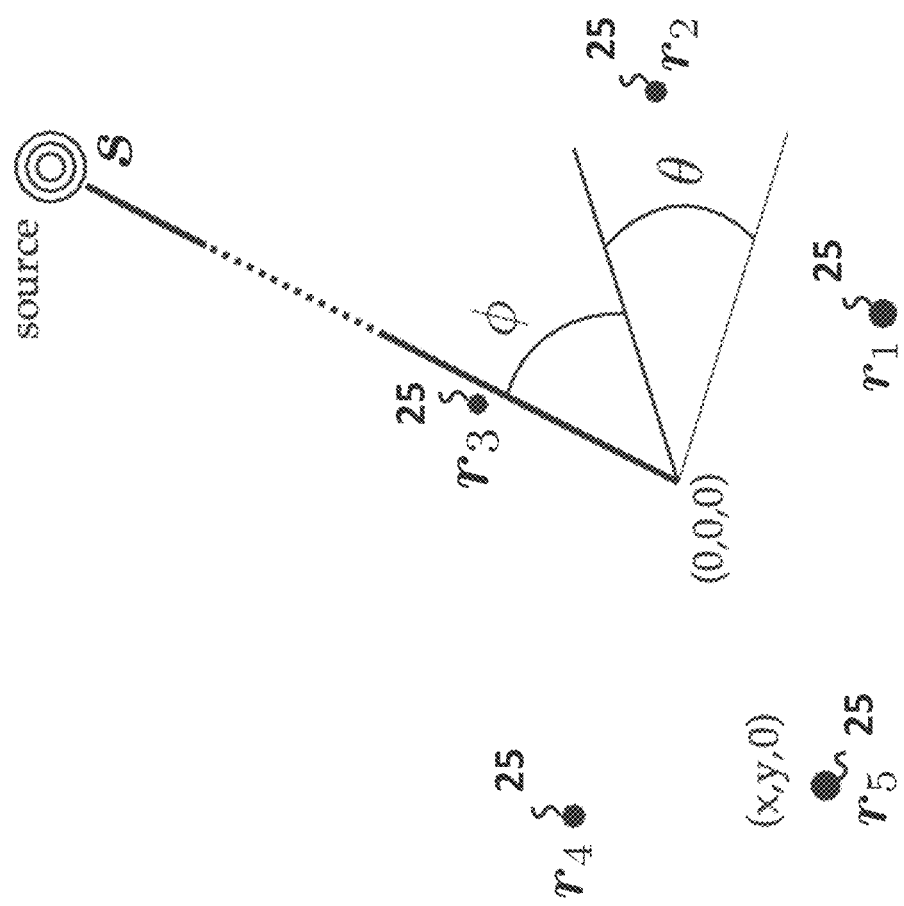
FIG. 2 illustrates the scenario of a far-field acoustic source whose acoustic signal is recorded with a planar microphone array.
Figure 3:
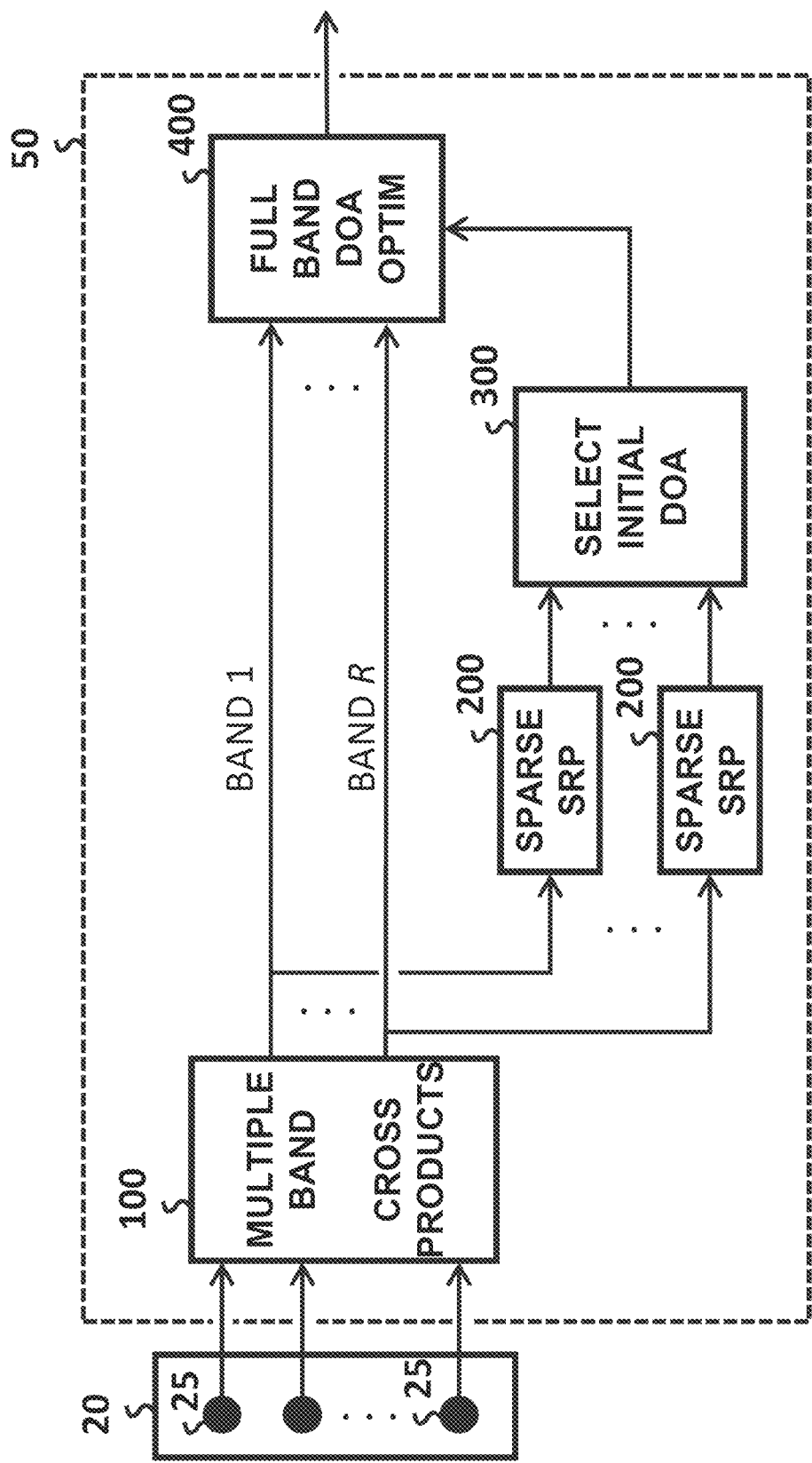
FIG. 3 shows the method and apparatus of the disclosed subject matter to estimate and validate the direction-of-arrival (DOA) of a plurality of sound sources from the signals captured by an array of microphones.

Referring to FIGS. 1-3, a method and apparatus 50 for estimating and validating the direction of arrival (DOA) of a plurality of sound sources 10 and 15 with a microphone array 20 composed of a plurality of microphones comprises a first stage 100 for computing cross-products of a plurality of microphone pairs for a plurality of spectral bands, followed by a sparse-promoting optimization stage 200 that converts a set of DOA estimates for each spectral band into a sparse steered-response power (SRP) representation, followed by a next stage 300 of selecting DOA candidates from the sparse SRPs, and followed by a last joint optimization stage 400 that improves and validates said DOA candidates with the original cross-product data from all spectral bands.

Let us define a narrowband signal component of a far-field sound source at DOA v arriving to a microphone placed at the known location r $$s(t)=S(t)\exp(j\Omega(t+c^{-1}v^T r))$$

where $\Omega$ is the analog central frequency of the band, and $S(t)$ is the in-band analytical time envelope. As the signal captured by the microphone undergoes a sampling process with sampling rate fs, the discrete-time signal to be processed further can be written as $$s[n]=S[n]\exp(j\omega(n+f_s c^{-1}v^T r)) \quad (10)$$

where n is discrete time, $S[n]$ the discrete-time analytical envelope, and $\omega$ the digital frequency ($\Omega=\omega f_s$).

Figure 4:
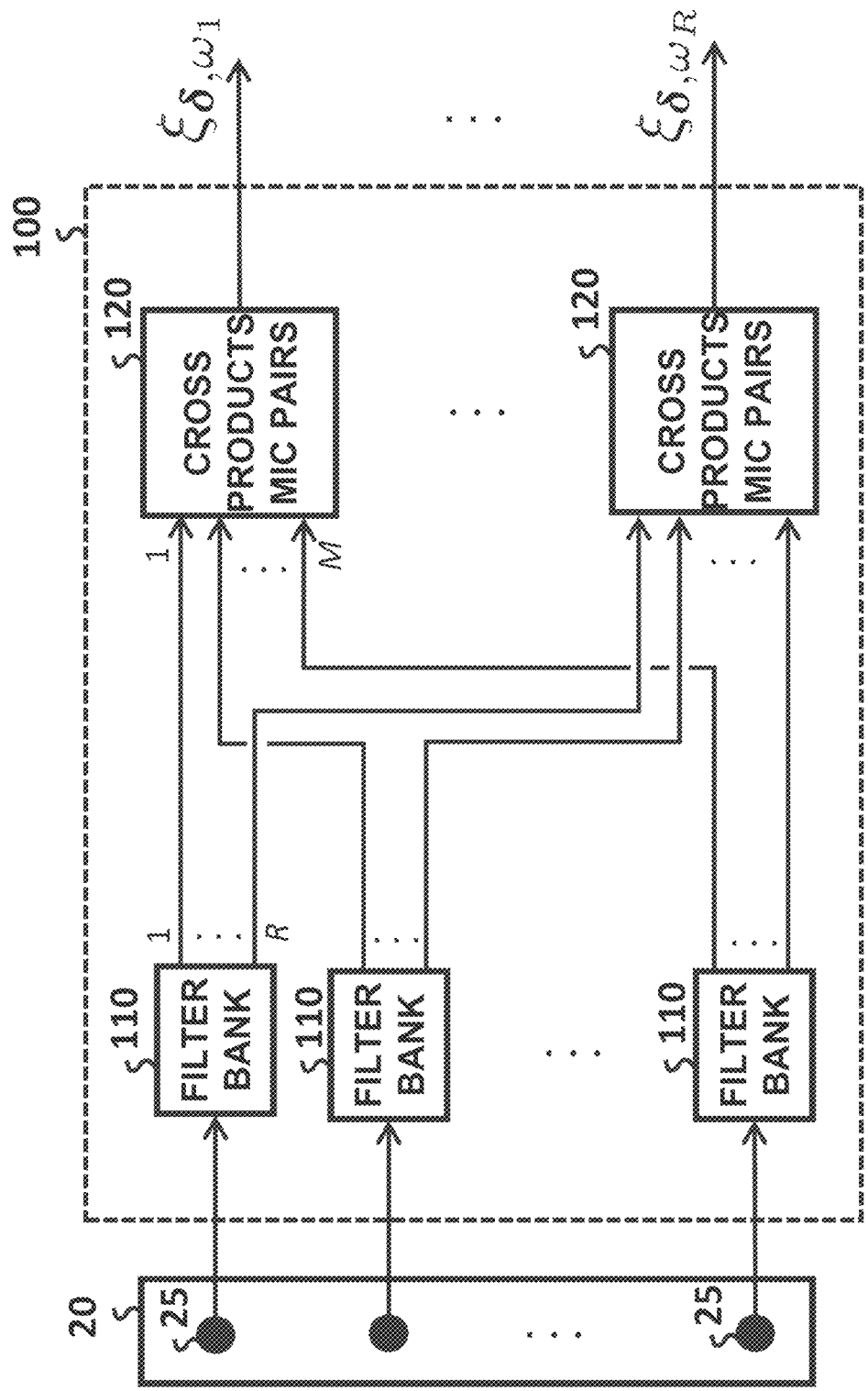
FIG. 4 illustrates the processing module of FIG. 3 that computes the multi-band cross-products from the microphone signals.

For the following description, the narrow-band model (10) is used and considered valid at all effects as it can be obtained, for instance, by filtering the original microphone signal with a digital narrowband bandpass filter. Said bandpass filtering can be accomplished with a filter-bank 110 (FIG. 4), such that the outputs of selected bands are further considered. However, it is worth pointing out that the present disclosure can also be applied to general broadband signals.

When multiple sources are present in the scene, the bandpass-filtered kth microphone signal can be modeled as $$x_k[n] = \sum_i s_{i,k}[n] + u_k[n]$$

where $u_k[n]$ is the in-band interference component, and $s_{i,k}[n]$ the signal component of the ith source $$s_{i,k}[n]=S_i[n]e^{j\omega n}\exp(j\omega \gamma v_i^T r_k) \quad (11)$$

with $v_i$ being the DOA vector of the ith source, and constant $\gamma=f_s/c$.

Since the digital filter is designed with a narrow passband, the analytical envelope $S_i[n]$ is observed nearly the same on each microphone, and in the practice the time of arrival affects only the phase of the carrier according to factor $v_i^T r_k$. On the other hand, the interference term $u_k[n]$ encompasses the diffuse background noise as well as the reverberations from the acoustic sources caused by reflections on the walls of the room and objects therein.

The cross-product $\xi_{k l,\omega}$ between the signals from the kth and lth microphones is obtained in the processing block 120 (FIG. 4) as $$\xi_{k\ell,\omega} = \sum_n x_k[n] x_\ell^*[n] \qquad (12)$$

where * denotes complex conjugate and n the discrete time index. The cross-product can be alternatively obtained by translating the raw microphone signals to the frequency domain and performing the following operation therein $$\xi_{k\ell,\omega} = \sum_r X_k[r] X_\ell^*[r] B[r - \omega] \qquad (13)$$

where $X_k[r]$ is the discrete Fourier transform of the kth microphone windowed signal block, r represents frequency bin, $B[r]$ is the baseband narrowband filter, and $\omega$ the central frequency of the spectral band. Even though in the practice (13) may be used instead of (12), especially when several spectral bands are involved, hence the filter-bank is replaced by a fast Fourier transform, the explanation of the method is conducted throughout the present disclosure with the time-domain formulation (12).

The common assumption is henceforth adopted, namely, that any two different sound sources 10, here designated with indices i, j, are uncorrelated with each other $$\sum_n s_{i,k}[n] s_{j,\ell}^*[n] = 0, \text{ for } i \neq j$$

In consequence, the cross-product (12) over a time block long enough is equivalent to the sum of the auto-product of the sources, that is $$\xi_{k\ell,\omega} \equiv \sum_j \sum_n s_{i,k}[n] s_{i,\ell}^*[n] + \eta_\omega \qquad (14)$$

where $\eta_\omega$ refers to the contribution of the diffuse components.

The auto-product of the ith source clearly results in $$\sum_n s_{i,k}[n] s_{i,\ell}^*[n] = \rho_i \exp(j\omega\gamma v_i^T (r_k - r_\ell)) \qquad (15)$$

where $\rho_i$ corresponds to its power in said spectral band $$\rho_i = \sum_n |S_i[n]|^2. \qquad (16)$$

In the present disclosure, the terms "energy" (integrated power over time) and "power" (momentary energy) are used interchangeably.

The difference between microphone locations, not their absolute positions, $$\delta_{kl} = r_k - r_l$$

is relevant in the auto-product (15). Two microphone pairs that result in the same difference vector (or its complementary) would correspond to the same, hence redundant, spatial information.

Figure 5:
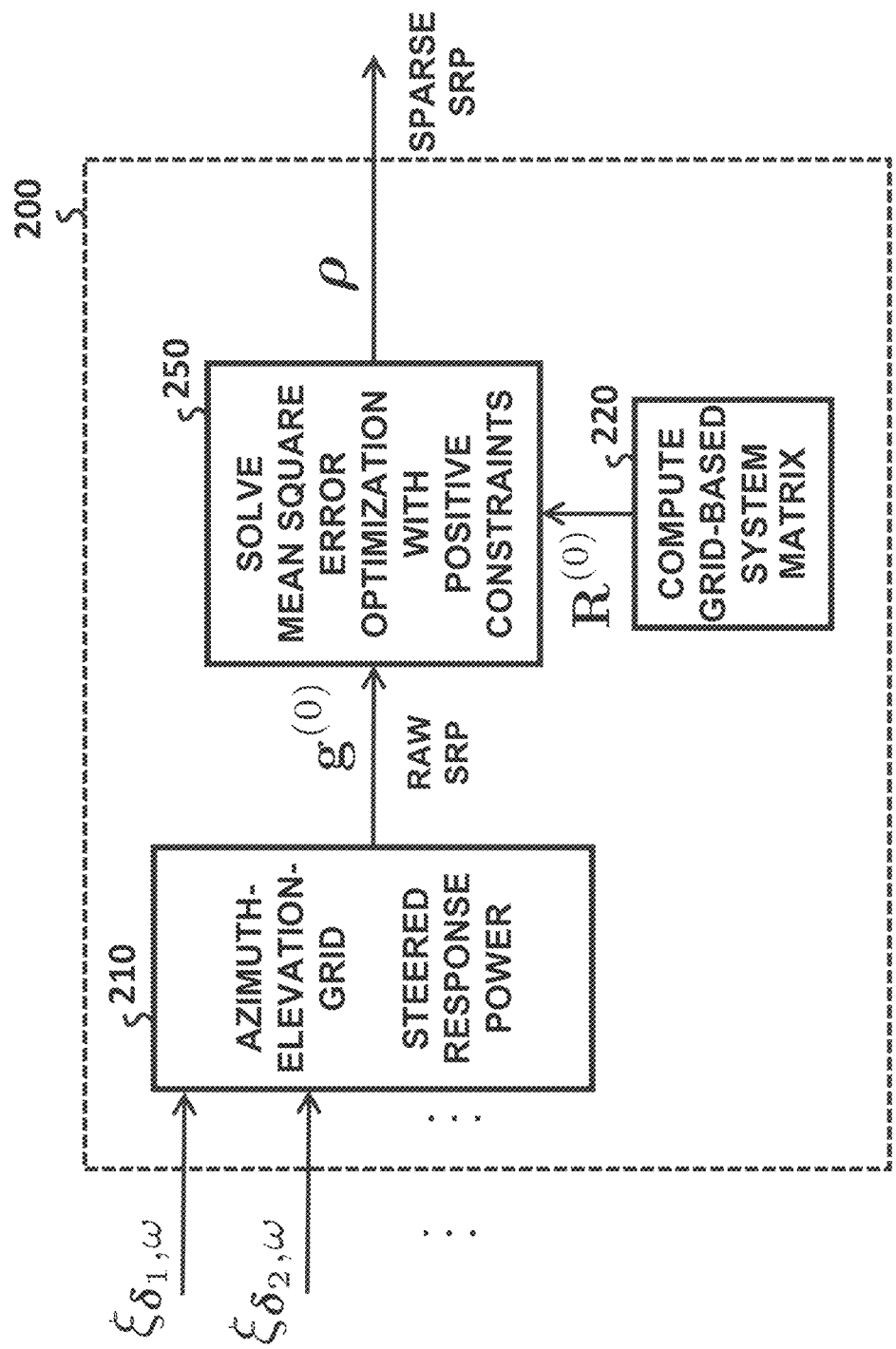
FIG. 5 describes the processing module of FIG. 3 that converts cross-products to the sparse steered-response power (sparse SRP) for a single spectral band.

In order to estimate the DOA of the sound sources from the cross-product data (12) from a plurality of microphone pairs, the processing block 200 is designed as illustrated in FIG. 5 to solve the following numerical error minimization with inequality constraints $$\min_{\rho_{\theta\phi}} \sum_{k} \sum_{\substack{\ell \\ \ell>k}} \left| \xi_{k\ell,\omega} - \sum_\theta \sum_\phi \rho_{\theta\phi} \exp(j\omega\gamma v_{\theta\phi}^T \delta_{k\ell}) \right|^2, \text{ subject to } \rho_{\theta\phi} \geq 0 \qquad (17)$$

where $v_{\theta\phi}$ is generically built with the azimuth $\theta$ and elevation $\phi$ as $$v_{\theta\phi} = [\cos \phi \cos \theta, \cos \phi \sin \theta, \sin \phi]^T. \qquad (18)$$

The numerical problem (17) is evaluated on a predefined set of DOA vectors built according to (18) with a grid of azimuth $\theta$ and elevation $\phi$ angles, and for a selected set of microphone pairs $\delta_{kl}$. Each tuple $\{v_{\theta\phi}, \rho_{\theta\phi}\}$ comprised of one of the pre-defined DOA vectors $v_{\theta\phi}$ of the grid and its respective power $\rho_{\theta\phi}$ is called a "DOA estimate" in the following, and the DOA estimates over all microphone pairs k,l form a set of DOA estimates in the spectral band $\omega$ considered. The second term of the difference in (17), the "model", constitutes a "model" cross-product, and the model cross-products over all microphone pairs k, l can be considered as a model cross-product set for the respective spectral band.

Said optimization problem comprises on the one hand the minimization of the absolute square difference between the input data (12) and the model (14), equivalent to the maximum likelihood optimization as the diffuse interference term $\eta_\omega$ in (14) is random Gaussian and with the same level in all microphone pairs, and on the other hand the inequality constraint, which can be immediately concluded as power (16) is always positive. Said inequality constraint promotes sparsity, that is, few elements $\rho_{\theta\phi}$ are to become larger than zero.

The solution to (17) is accomplished with the following iterative algorithm $$\rho^{(\kappa+1)} = (R^{(\kappa)})^{-1} g^{(\kappa)} \qquad (19)$$

by rejecting at every iteration $\kappa$ the terms in the partial solution with negative value, that is, by removing the rows and columns in the matrix $R^{(\kappa)}$ that correspond to the elements in the vector with the power estimates $\rho^{(\kappa)}$ that are negative; said positions in vector $g^{(\kappa)}$ are removed accordingly; the iterative algorithm reaches convergence once vector $\rho^{(\kappa+1)}$ has only non-negative elements. The DOA estimates that have been removed during the iterative process are considered to have estimated null power, hence irrelevant in the next algorithm iteration.

The algorithm (19) is executed by module 250. The initial vector $g^{(0)}$ and the constant symmetric auto-correlation matrix $R^{(0)}$ are computed in modules 210 and 220 respectively the same way that in any mean-square-error minimization problem such as (17), a procedure that is well known to anyone skilled with the state of art. It is worth though providing details about the initial vector $g^{(0)}$: its component for $\theta$ and $\phi$ is obtained as $$g_{\theta_\phi} = \Re \sum_k \sum_\ell \xi_{k\ell,\omega} \exp(-j\omega\gamma v_{\theta\phi}^T \delta_{k\ell}) \quad (20)$$

where $\Re$ denotes real part, which is equivalent to the steered-response power as defined in (8), restricted to a narrow spectral band.

Figure 6:
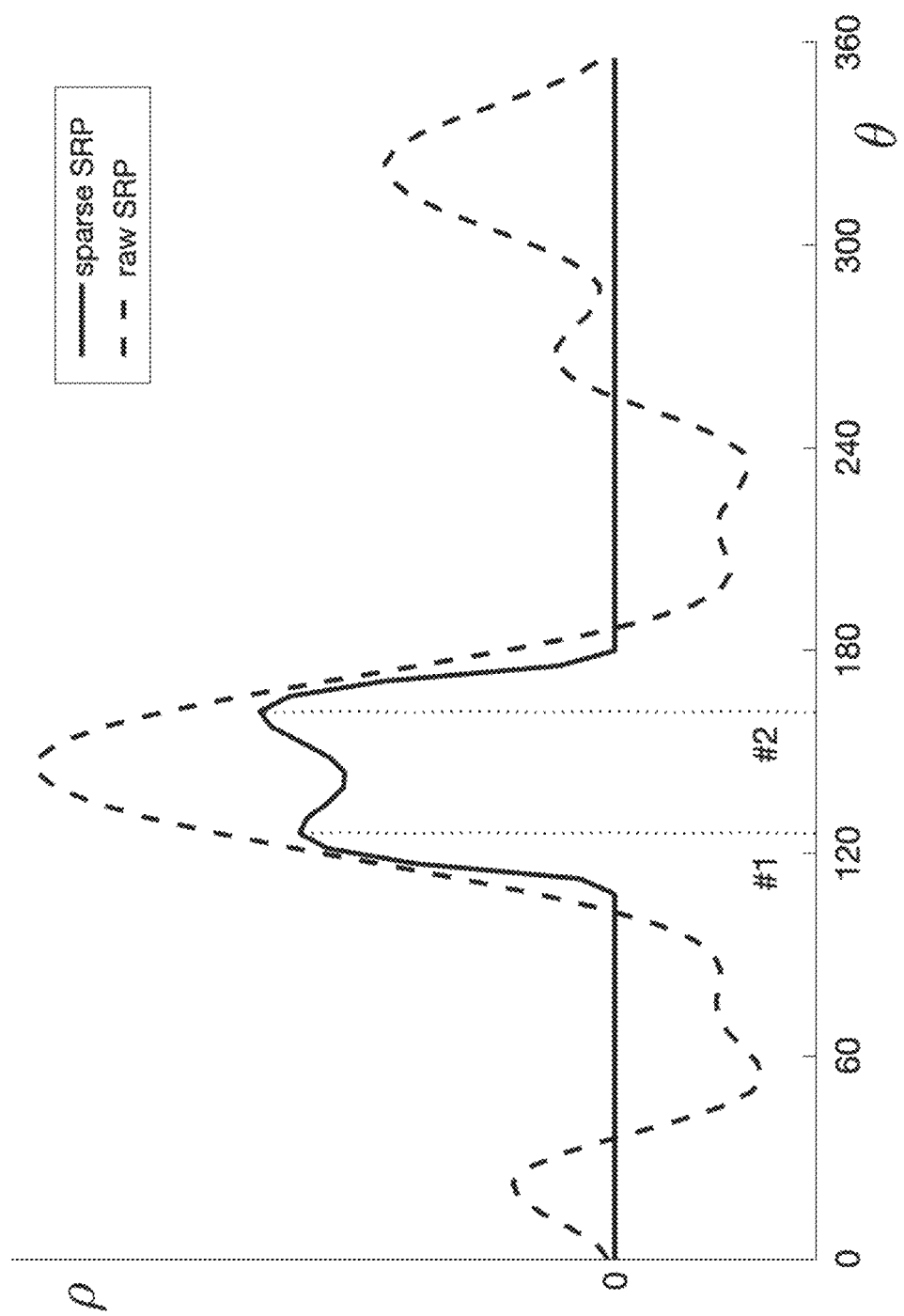
FIG. 6 shows the resolution of the sparse SRP in a circular microphone array on a scenario with two acoustic sources.

Hence, stages 200 convert each narrowband SRP (20) into a truly sparse SRP mapping, with few elements different than zero. Stages 200 thus produce a sparsified set of DOA estimates. FIG. 6 illustrates the outcome of this stage on a circular array with five microphones: the presence of two sources spaced in azimuth $\theta$ by 30 degrees is seen as one local maximum in the original SRP; however, the resulting sparse SRP manifests two local maxima, each one pointing to each source. The enhanced resolution delivered by the sparse SRP versus the original SRP is a key aspect in the present disclosure.

By locating the samples pointing out to local maxima #1 and #2 in the sparse SRP (illustrated in FIG. 6 with dotted vertical lines), one set of DOA candidates per spectral band can be obtained from the respective azimuth and elevation values, a task carried out by module 300.

The resulting estimates may not be sufficiently accurate if the $\{\theta,\phi\}$-grid is not dense enough, which is in turn a desired aspect because it alleviates the numerical complexity of the algorithm (19). Furthermore, the use of a single spectral band and its information therein limits the accuracy of the source detection because:

the spectral narrow band with center frequency co works safer for microphone pairs whose distance does not violate the sampling theorem; however, higher spectral bands can deliver more accuracy at the risk of delivering "fake" peaks, e. g. artifacts caused by Nyquist violations, and the sources may not have enough energy in the selected spectral band.

Based on the previous arguments, it is suggested to use an analytical filter bank 110 that splits each microphone signal into a plurality of narrow spectral bands, and compute the cross-products between selected pairs of microphones for each band separately in the modules 120; the resulting cross-products are used to compute a sparse SRP for each individual band in stages 200; a set of DOA candidates is obtained from the local maxima in the sparse SRPs of the individual spectral bands, a merging task that is carried out in the processing stage 300.

This merging in stage 300 can, e.g., comprise forming a union set of the DOA candidate sets of all spectral bands into a merged DOA candidate set. Alternatively, the merging in stage 300 can comprise forming an intersection of the DOA candidate sets of all spectral bands with respect to their DOA vectors, to yield the merged DOA candidate set.

Figure 7:
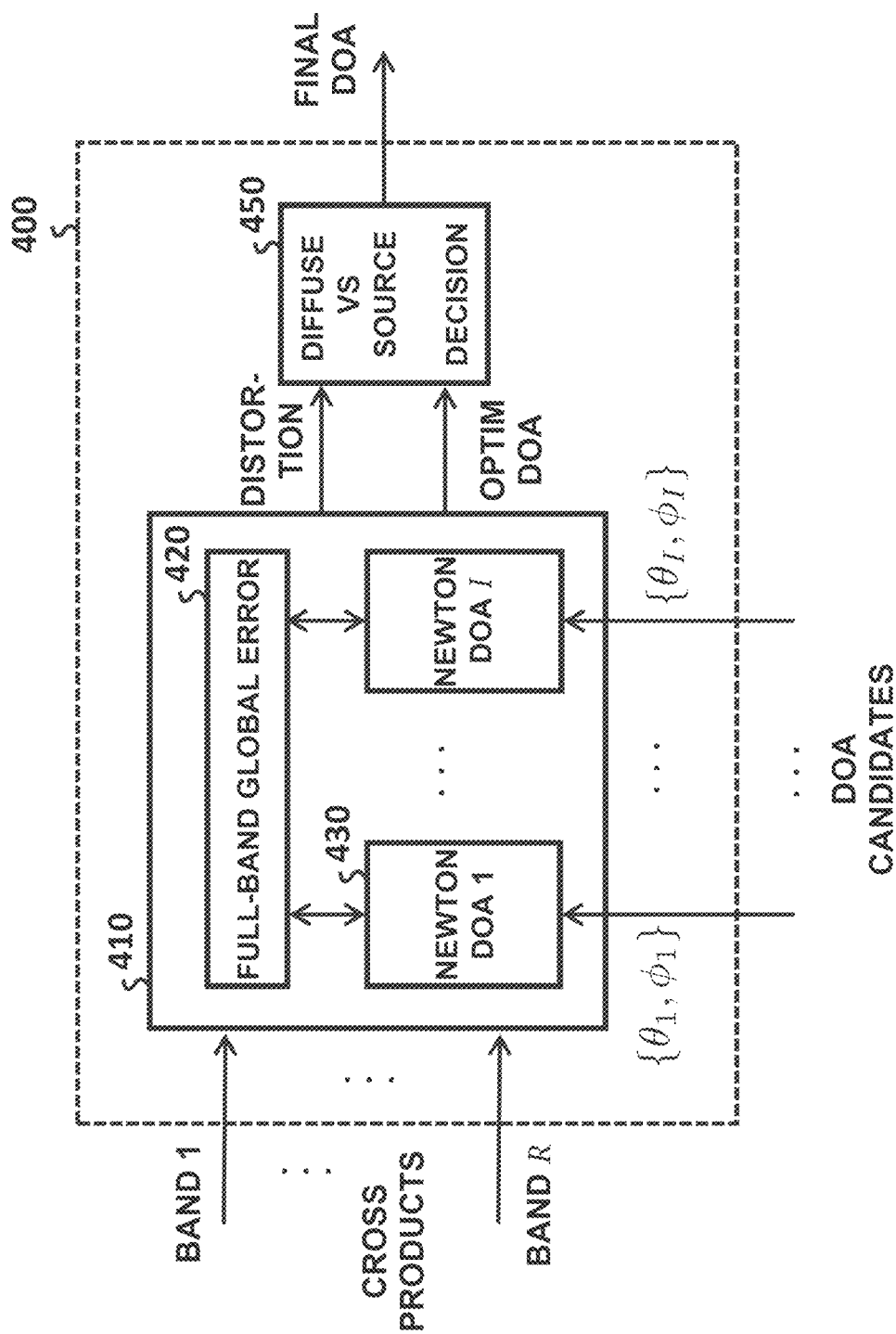
FIG. 7 describes the processing module of FIG. 3 that computes the final estimates of the DOA from the cross-products for all spectral bands.

Finally, in order to improve and validate said DOA candidates, the last processing stage 400 (FIG. 7) executes a numerical algorithm with the original crossproducts from all spectral bands.

In order to detail the composition of the final processing stage 400, a generic ith sound source is defined to have the following parameters:

$\rho_{i,\omega}$, the energy of said source in the spectral band co, and
$v_i$, its frequency-independent DOA vector.

Module 410 is designed to solve the following numerical problem of minimising a global error with inequality constraints $$\min_{\rho_{i,\omega}, v_i} \sum_\omega \sum_k \sum_\ell \left| \xi_{k\ell,\omega} - \sum_m \rho_{\theta_\phi} \exp(j\omega\gamma v_{i,\phi}^T \delta_{k\ell}) \right|^2, \text{ subject to } \rho_{i,\omega} \geq 0 \quad (21)$$

where the outcome thereof are both the spectral energies $\rho_{i,\omega}$ and the DOA vector $v_i$ for the ith source. All second terms of the differences in (21), considered over all microphone pairs k, in all spectral bands co, correspond to a "model" global cross-product set (the "global model" over all spectral bands).

Because the numerical problem (21) is nonlinear, the solution thereto can be accomplished with a Newton-Raphson algorithm for every DOA candidate in module 410

$$\begin{bmatrix} v_i^{(k+1)} \\ \rho_{i,\omega_1}^{(k+1)} \\ \vdots \\ \rho_{i,\omega_R}^{(k+1)} \end{bmatrix} = \begin{bmatrix} v_i^{(k)} \\ \rho_{i,\omega_1}^{(k)} \\ \vdots \\ \rho_{i,\omega_R}^{(k)} \end{bmatrix} - (H_i^{(k)})^{-1} \nabla_j^{(k)}$$

where the parametric vector contains the elements that define the ith source.

For the sake of completeness, all terms that compose the Hessian matrix $H_i^{(K)}$ and the gradient $\nabla_i^{(K)}$ are provided. The gradient results in $$\frac{\partial \mathcal{J}^{(k)}}{\partial v_i^T} = -\gamma \sum_k \sum_\ell \delta_{k\ell} \sum_\omega \omega \rho_{i,k\ell}^{(k)} \Re\{e_{k\ell,\omega}^{(k)} \exp(-j\omega\gamma \delta_{k\ell}^T v_j^{(k)})\} \quad (22)$$

$$\frac{\partial \mathcal{J}^{(k)}}{\partial \rho_{i,\omega}} = -\sum_k \sum_\ell \Re\{e_{k\ell,\omega}^{(k)} \exp(-j\omega\gamma \delta_{k\ell}^T v_j^{(k)})\} \quad (23)$$

where $\mathcal{J}$ represents the minimizing functional in (21), $\Re\{\cdot\}$ and $\Im\{\cdot\}$ denote real and imaginary part respectively, and $e_{k\ell,\omega}$ is the error at k,b $\ell$ and at $\omega$ $$e_{k\ell,\omega}^{(k)} = \xi_{k\ell,\omega} - \sum_m \rho_{m,\omega}^{(k)} \exp(j\omega\gamma \delta_{k\ell}^T v_m^{(k)}) \quad (24)$$

which is obtained in module 420 and feeds the Newton-Raphson algorithm for every DOA candidate.

The Hessian corresponds to the symmetric matrix built with the terms $$\frac{\partial^2 \mathcal{J}^{(k)}}{\partial^2 v_i} = \gamma^2 \sum_k \sum_l \delta_{kl} \delta_{kl}^T \sum_\omega ((\rho_{i,\omega}^{(k)})^2 + \rho_{i,\omega}^{(k)} \Re\{e_{ki,\omega}^{(k)} \exp(-j\omega\gamma \delta_{kl}^T v_i^{(k)})\}) \quad (25)$$

-continued $$\frac{\partial^2 \mathcal{J}^{(k)}}{\partial^2 \rho_{i,\omega}} = \sum_k \sum_l 1$$

$$\frac{\partial^2 \mathcal{J}^{(k)}}{\partial^2 v_i \partial \rho_{i,\omega}} = -\gamma \sum_k \sum_l \delta_{k\ell}^T \sum_\omega \omega \mathcal{R}\{e_{k\ell,\omega}^{(k)} \exp(-j\omega\gamma\delta_{kl}^T v_i^{(k)})\}$$

$$\frac{\partial^2 \mathcal{J}^{(k)}}{\partial \rho_{l,\omega} \partial \rho_{i,\omega}} = 0.$$

The Hessian is dominated by a positive-definite component, while its nonpositive component vanishes as the error (24) becomes orthogonal to the far-field model. This last fact is the sign of a locally convex problem, which is a guarantee that the algorithm can converge to a solution.

The nonnegative constraints in (21) imply during the execution of the Newton-Raphson algorithm that any power $\rho_{i,\omega}$ violating said constraint is considered to be null, hence it must be removed from the parametric vector, the corresponding element in the gradient vector and the corresponding row and column of the Hessian matrix.

The resulting DOA candidates are optimum in the multi-band far-field sense (21). In consequence, those initial DOA candidates, selected in processing block 300, that happened to be actually pointing to Nyquist artifacts will vanish upon the execution of module 410, e. g. their energy resulting as $\rho_{i,\omega} \cong 0$, while those candidates that correspond to actual sound sources will prevail, exhibiting dominant spectral energy.

As the actual acoustic scenario contains diffuse noise and reverberations, encompassed by term $\eta_\omega$ in (14), the free- and far-field model describes only part of the content in the cross-products, such that the amount of actual far-field components therein can be assessed as $$FD = \frac{\sum_\omega \sum_k \sum_\ell |e_{k\ell,\omega}|^2}{\sum_\omega \sum_k \sum_\ell |\xi_{k\ell,\omega}|^2}. \tag{26}$$

The distortion (26) is bounded $0 \leq D \leq 1$, such that a low value of distortion is an ample evidence of the presence of relevant acoustic sources, while a large value, close to 1, occurs when diffuse sounds dominate. The decision stage 450, based for instance by comparing D to a threshold, can be used to accept ("validate") or to reject ("unvalidate") the DOA estimates.

FIG. 8 brings the numerical outcome of the method in the same scenario covered by FIG. 6. Two initial DOA candidates were selected in module 300 at the position of local maxima in the sparse SRP. Despite the azimuth $\theta$ in both candidates do not differ much from the actual values, their initial elevation value $\phi$ is equal to zero, which is far from the correct elevation values. That initial value corresponds to the only item in the elevation grid during the sparse-promoting method 200, a design decision to keep the computation complexity thereof low. The resulting high value of distortion (26) for those initial DOA candidates would initially mean that the estimated far-field model is severely corrupted by diffuse interferences. However, the outcome of module 400 over the same spectral band improves not only the azimuth but also the elevation for both DOA candidates; moreover, the global distortion value that results thereof is very low, this suggesting the presence of far-field sound sources at the resulting DOA estimates.

It goes without saying that all stages and modules described above can be implemented either as hardware components or as software components running on a computer or similar electronic processor. Also mixed embodiments are possible where some of the stages and/or modules are implemented as hardware components and others as software components. The disclosed subject matter is thus not limited to the specific embodiments disclosed herein, but encompasses all variants, modifications and combinations thereof which fall into the scope of the appended claims.

What is claimed is:

1. A computer-implemented method for measuring the directions of arrival, DOAs, of acoustic signals recorded by an array of at least two microphones outputting respective audio signals, comprising:
   bandpass-filtering the audio signals into at least one spectral band;
   in each spectral band, for at least one pair of microphones, computing a cross-product between the audio signals of said pair, yielding a set of cross-products per spectral band;
   in each spectral band, iteratively minimizing an error between the cross-product set and a model cross-product set calculated from a set of DOA estimates, wherein each DOA estimate comprises a DOA vector and a power, wherein the powers of the DOA estimates are changed with every iteration, and wherein in each iteration all those DOA estimates are removed from the DOA estimate set whose powers have a negative value;
   in each spectral band, determining from the DOA estimate set those DOA estimates whose powers constitute local maxima, as DOA candidates, yielding a set of DOA candidates per spectral band;
   merging the DOA candidate sets of all spectral bands into a merged DOA candidate set; and
   measuring the DOAs of the acoustic signals from the merged DOA candidate set.

2. The method of claim 1, wherein the audio signals are bandpass-filtered into at least two spectral bands.

3. The method of claim 1, wherein cross-products are computed for at least two pairs of microphones.

4. The method of claim 1, wherein said error is defined by the term $$\sum_k \sum_l \left| \xi_{kl,\omega} - \sum_\theta \sum_\phi \rho_{\theta\phi} \exp(j\omega\gamma v_{\theta\phi}^T \delta_{kl}) \right|^2$$

and minimized with respect to $\rho_{\theta\phi}$ under the constraint $\rho_{\theta\phi} \geq 0$ with:

$\xi_{kl,\omega}$ ... cross-product in spectral band $\omega$ between kth audio signal and lth audio signal, the cross-products of all pairs k, l building the cross-product set, $$\sum_\theta \sum_\phi \rho_{\theta\phi} \exp(j\omega\gamma v_{\theta\phi}^T \delta_{kl}) \dots$$

model cross-product in spectral band $\omega$ between kth audio signal and lth audio signal based on the set of DOA estimates each comprised of the DOA vector $v_{\theta\phi}$ and the power $\rho_{\theta\phi}$, the model cross-products of all pairs k, l building the model cross-product set, $\theta$ ... azimuth angle, ϕ ... elevation angle, $v_{\theta\phi}$ .... DOA vector [cos ϕ cos θ, cos ϕ sin θ, sin ϕ] of the respective DOA estimate, $\rho_{\theta\phi}$ ... estimated acoustic signal power at the microphone array in the direction of the DOA vector of the respective DOA estimate, k ... index of kth microphone, l ... index of lth microphone, $\xi_{kl}$ ... vector from lth microphone to kth microphone, ω ... center frequency of spectral band in question, γ ... sampling rate of the digitized audio signals divided by the speed of sound, exp ... exponential function, j ... square root of −1, and T ... designating the transpose.

5. The method of claim 1, wherein the step of merging comprises forming a union set of the DOA candidate sets of all spectral bands.

6. The method of claim 1, wherein the step of merging comprises forming an intersection set of the DOA candidate sets of all spectral bands with respect to the DOA vectors of the DOA candidates.

7. The method of claim 1, wherein the step of measuring further comprises:

iteratively minimizing a global error between the cross-product sets of all spectral bands and a model global cross-product set calculated from the merged DOA candidate set, wherein the DOA vectors and powers of the merged DOA candidate set are changed with every iteration; and then determining the DOAs of the acoustic signals from the merged DOA candidate set.

8. The method of claim 7, wherein said global error is defined by the term $$\sum_{\omega}\sum_{k}\sum_{l}\left|\xi_{kl,\omega} - \sum_{m}\rho_{m,\omega}\exp(j\omega\gamma v_m^T \delta_{kl})\right|^2$$

and minimized with respect to $\rho_{m,\omega}$ and $v_m$ under the constraint $\rho_{m,\omega} \geq 0$ with:

$\xi_{kl,\omega}$ ... cross-product in spectral band ω between kth audio signal and lth audio signal, the cross-products of all pairs k, l and over all spectral bands ω building the cross-product set of all spectral bands, $$\sum_{m}\rho_{m,\omega}\exp(j\omega\gamma v_m^T \delta_{kl})\ldots$$

model cross-product in spectral band ω between kth audio signal and lth audio signal based on all DOA candidates each comprised of the DOA vector $v_m$ and the power $\rho_{m,\omega}$ of the mth DOA candidate in spectral band ω, the model cross-products of all pairs k, l and over all spectral bands ω building the model global cross-product set, $v_m$ .... DOA vector [cos ϕ$_m$ cos θ$_m$, cos ϕ$_m$ sin θ$_m$, sin ϕ$_m$] of the mth DOA candidate, $\rho_{m,\omega}$ ... estimated acoustic signal power at the microphone array per spectral band ω in the direction of the DOA vector of the mth DOA candidate, k ... index of kth microphone, l ... index of lth microphone, m ... index of mth DOA candidate, $\xi_{kl}$ ... vector from lth microphone to kth microphone, ω ... center frequency of spectral band in question, γ ... sampling rate of the digitized audio signals divided by the speed of sound, exp ... exponential function, j ... square root of −1, and T ... designating the transpose.

9. The method of claim 7, wherein the global error is minimized with a Newton-Raphson algorithm.

10. The method of claim 7, wherein the step of determining further comprises:

validating the determined DOAs when the minimized global error, normalized with respect to the sum of the cross-product sets of all spectral bands, exceeds a predetermined threshold.

11. An apparatus for measuring the directions of arrival, DOAs, of acoustic signals, comprising:

an array of at least two microphones configured to record the acoustic signals and to output respective audio signals;

at least one filter-bank, each filter bank being connected to one of the microphones and configured to bandpass-filter the audio signal of that microphone into at least one spectral band;

at least one cross-product module connected to the filter-bank/s, each cross-product module being assigned to one spectral band and configured to compute, for each spectral band, a cross-product between the audio signals of a respective pair of microphones, yielding a set of cross-products per spectral band;

at least one iteration module connected to the cross-product module/s, each iteration module being assigned to one spectral band and configured to iteratively minimize an error between the cross-product set and a model cross-product set calculated from a set of DOA estimates, wherein each DOA estimate comprises a DOA vector and a power, wherein the powers of the DOA estimates are changed with every iteration, and wherein in each iteration all those DOA estimates are removed from the DOA estimate set whose powers have a negative value; and a measuring module connected to the iteration module/s and configured to determine, in each spectral band, from the DOA estimate set those DOA estimates whose powers constitute local maxima, as DOA candidates, yielding a set of DOA candidates per spectral band, to merge the DOA candidate sets of all spectral bands into a merged DOA candidate set, and to measure the DOAs of the acoustic signals from the merged DOA candidate set.

12. The apparatus of claim 11, wherein each filter-bank is configured to bandpass-filter the audio signals into at least two spectral bands.

13. The apparatus of claim 11, wherein the apparatus comprises at least two cross-product modules.

14. The apparatus of claim 11, wherein the measuring module comprises a global iteration module, the global iteration module being configured to iteratively minimize a global error between the cross-product sets of all spectral bands and a model global cross-product set calculated from the merged DOA candidate set, wherein the DOA vectors and powers of the merged DOA candidate set are changed with every iteration, and wherein the measuring module is configured to determine the DOAs of the acoustic signals from the merged DOA candidate set after the global iteration module has minimized the global error.

* * * * *